(12) United States Patent
Yamaguchi et al.

(10) Patent No.: US 6,224,006 B1
(45) Date of Patent: May 1, 2001

(54) SPINNING REEL HAVING TAPERED SPOOL AND COMPACT REEL BODY

(75) Inventors: Akira Yamaguchi, Iruma; Wataru Tsutsumi, Toda, both of (JP)

(73) Assignee: Daiwa Seiko, Inc., Higashikurume (JP)

( * ) Notice: Subject to any disclaimer, the term of this patent is extended or adjusted under 35 U.S.C. 154(b) by 0 days.

(21) Appl. No.: 09/271,436

(22) Filed: Mar. 18, 1999

(30) Foreign Application Priority Data

| Mar. 20, 1998 | (JP) | ................................................. | 10-071680 |
| Mar. 26, 1998 | (JP) | ................................................. | 10-079310 |
| Mar. 26, 1998 | (JP) | ................................................. | 10-079311 |

(51) Int. Cl.[7] .................................................. A01K 89/01
(52) U.S. Cl. .......................... 242/241; 242/311; 242/321; 242/322; D22/141
(58) Field of Search ........................... D22/141; 242/311, 242/322, 230, 231, 233, 232, 241, 321

(56) References Cited

U.S. PATENT DOCUMENTS

| D. 347,877 | * | 6/1994 | Asano et al. .......................... D22/141 |
| D. 393,689 | * | 4/1998 | Kaneko et al. ....................... D22/141 |
| D. 403,395 | * | 12/1998 | Yoshikawa et al. ................. D22/141 |
| D. 404,461 | * | 1/1999 | Kaneko et al. ....................... D22/141 |
| 2,498,987 | * | 2/1950 | Duncan ................................. 242/232 |
| 4,770,363 | * | 9/1988 | Tsunoda et al. ..................... 242/241 |
| 5,195,699 | * | 3/1993 | Stinnette ............................... 242/322 |
| 5,368,247 | * | 11/1994 | Young ................................... 242/231 |
| 5,558,289 | * | 9/1996 | Hirayama et al. ................... 242/231 |
| 5,615,841 | * | 4/1997 | Saito ..................................... 242/322 |
| 5,746,382 | * | 5/1998 | Tsutsumi .............................. 242/322 |
| 5,820,053 | * | 10/1998 | Takeuchi et al. .................... 242/231 |
| 5,829,699 | * | 11/1998 | Tsutsumi .............................. 242/241 |
| 5,845,858 | * | 12/1998 | Amano et al. ....................... 242/231 |
| 6,050,511 | * | 4/2000 | Katayama ............................ 242/231 |

FOREIGN PATENT DOCUMENTS

| 61-19658 | 6/1986 | (JP) . |
| 63-2568 | 1/1988 | (JP) . |
| 1-42461 | 12/1989 | (JP) . |

* cited by examiner

Primary Examiner—Katherine A. Matecki
(74) Attorney, Agent, or Firm—Oblon, Spivak, McClelland, Maier & Neustadt, P.C.

(57) ABSTRACT

A spinning reel comprises a reel body, a rotor and a spool having a front flange portion. The reel body and the spool are constructed such that a ratio (A/L) of a diameter (A) of the front flange portion of the spool to an axial length (L) of part of the reel body, positioned behind a rear end portion of the rotor, is in a range of 115% to 200%.

4 Claims, 6 Drawing Sheets

SPINNING REEL HAVING TAPERED SPOOL AND COMPACT REEL BODY

BACKGROUND OF THE INVENTION

The present invention relates to a spinning reel for fishing.

The spinning reel comprises a reel body with a leg portion (rod attachment portion) for attachment to a fishing rod, a rotor so supported at a front portion of the reel body as to be rotatable in interlock with a winding rotary operation of a handle, and a spool which is moved back and forth by the winding rotary operation of the handle. A pair of support arms are attached to the rotor. Bail support members for supporting a bail are supported on distal end portions of the respective support arms so as to be rotatable between a line release position and a line wind-up position. A line guide, which rotates around the spool in accordance with the rotation of the rotor caused by the winding rotary operation of the handle, is provided on one of the bail support members. With this structure, if the handle is rotated, the line is uniformly wound around the spool, which moves back and forth, via the line guide rotating along with the rotor.

The spinning reel, as described above, is constructed such that the line guide supported on the rotor rotates around the spool moving back and forth, thereby winding the line around the spool. Accordingly, in general, the spool is constructed such that the diameter is relatively small. In addition, since the spinning reel is constructed such that the line can be easily released by raising the bail and disengaging the line from the line guide, it can be easily used at the fishing spot.

In the conventional spinning reel, however, the diameter of the spool is relatively small and thus the following problems will arise: the amount of line capable of being wound around the spool is small; when the line is being wound or released, curling or twisting of line will easily occur; and the efficiency of winding is low. Moreover, in the case where the diameter of the spool is small, the fisherman who wishes to use a spinning reel with a large line winding capacity has to choose a large-sized spinning reel from among models of several superior ranks. More specifically, with the structure of the conventional spinning reel, when a line winding capacity of a certain degree is needed, one has to use a spinning reel having a greater size than necessary, which is inferior in portability and operability.

The spinning reel is constructed such that such members as a spool, a rotor and a reel body are axially arranged in tandem. Consequently, the axial dimension of the reel tends to increase. As a result, the balance of the structure of the entire body is not good, and the operability and portability deteriorate.

Furthermore, in the conventional spinning reel, the size of the spool is relatively small, compared to the reel body. Thus, the distance between the leg of the reel body and the front flange portion of the spool is long. Consequently, in the conventional spinning reel, it is difficult to apply resistance directly to the line released from the spool by the finger of the hand holding the reel as well as the fishing rod, or to perform a fingering operation at the time of releasing the line, such as checking of the rotation of the spool. Thus, the operability is low.

As has been described above, the conventional spinning reel is so constructed as to merely achieve the basic functions of line winding/releasing. No devices have been made for improvements in various functions, such as improvement in balance of the entire body, and improvement in line winding/releasing functions.

BRIEF SUMMARY OF THE INVENTION

An object of the present invention is to provide a spinning reel so efficiently formed as to reduce the size of the entire structure, enhance the balance in structure, and improve various functions such as line releasing/winding functions.

Another object of the invention is to provide a spinning reel so efficiently formed as to enhance fishing operability such as fingering operation.

DETAILED DESCRIPTION OF THE INVENTION

Figure 1:
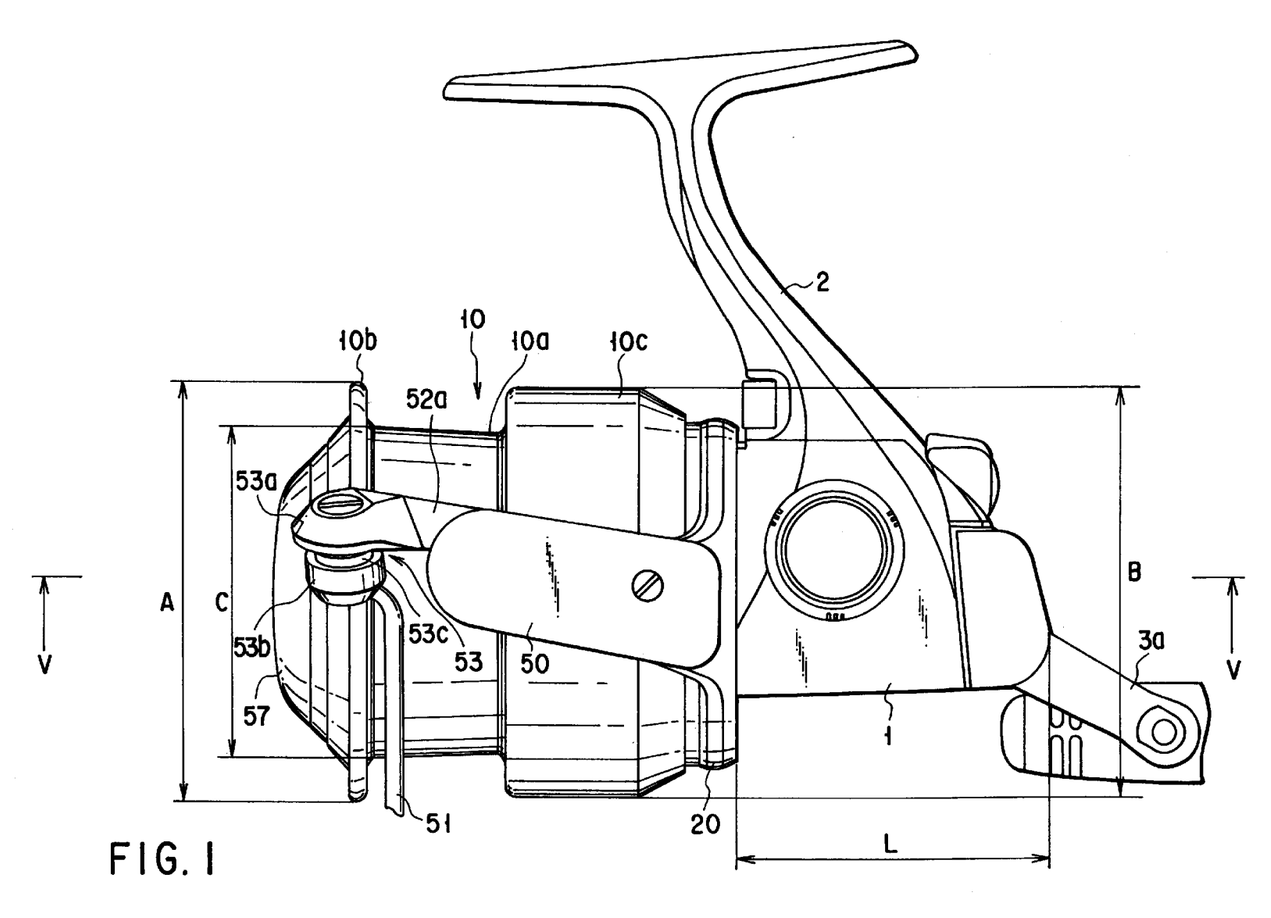
FIG. 1 is a side view showing an embodiment of a spinning reel according to the present invention.
Figure 2:
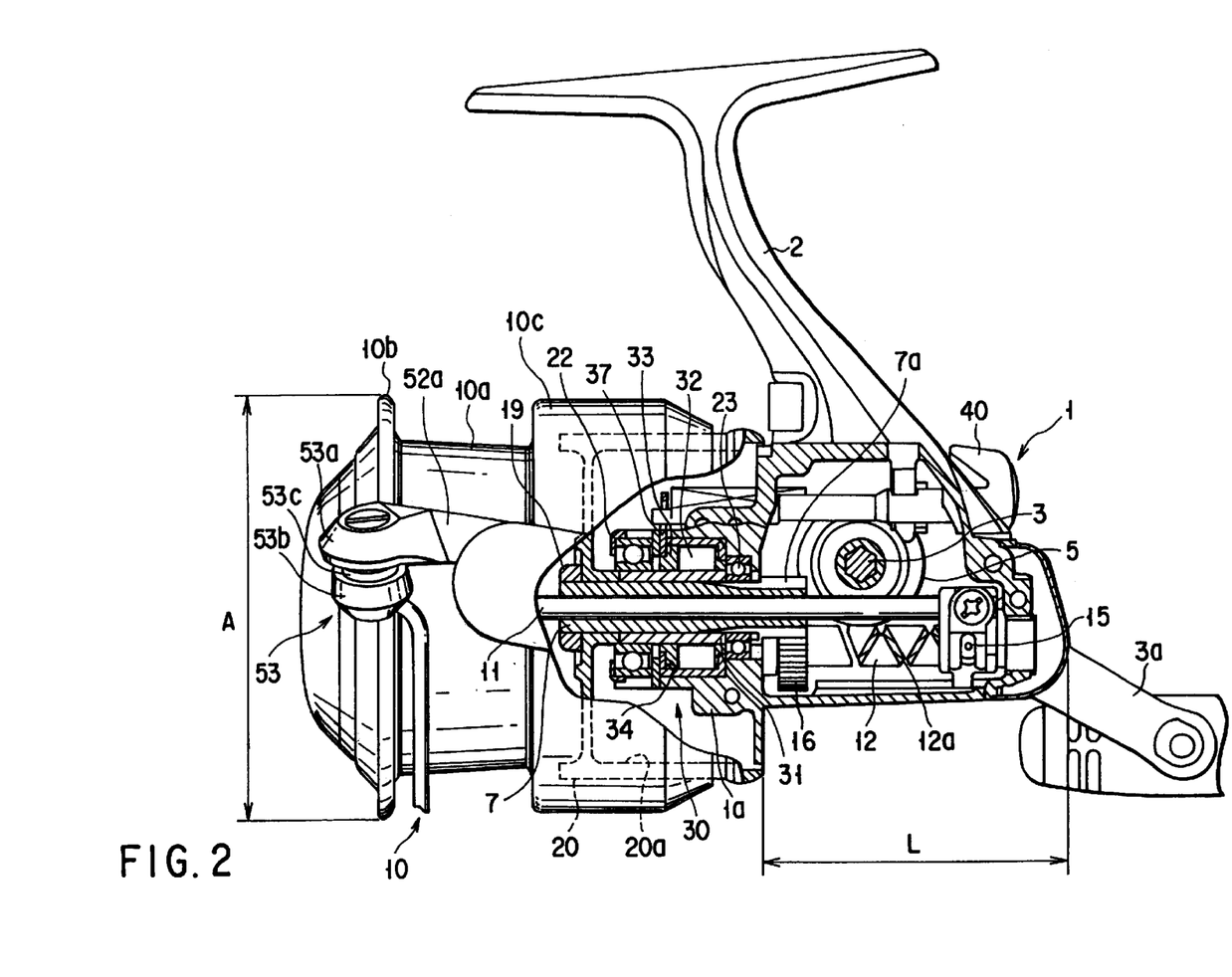
FIG. 2 shows an internal structure of the spinning reel shown in FIG. 1.
Figure 3:
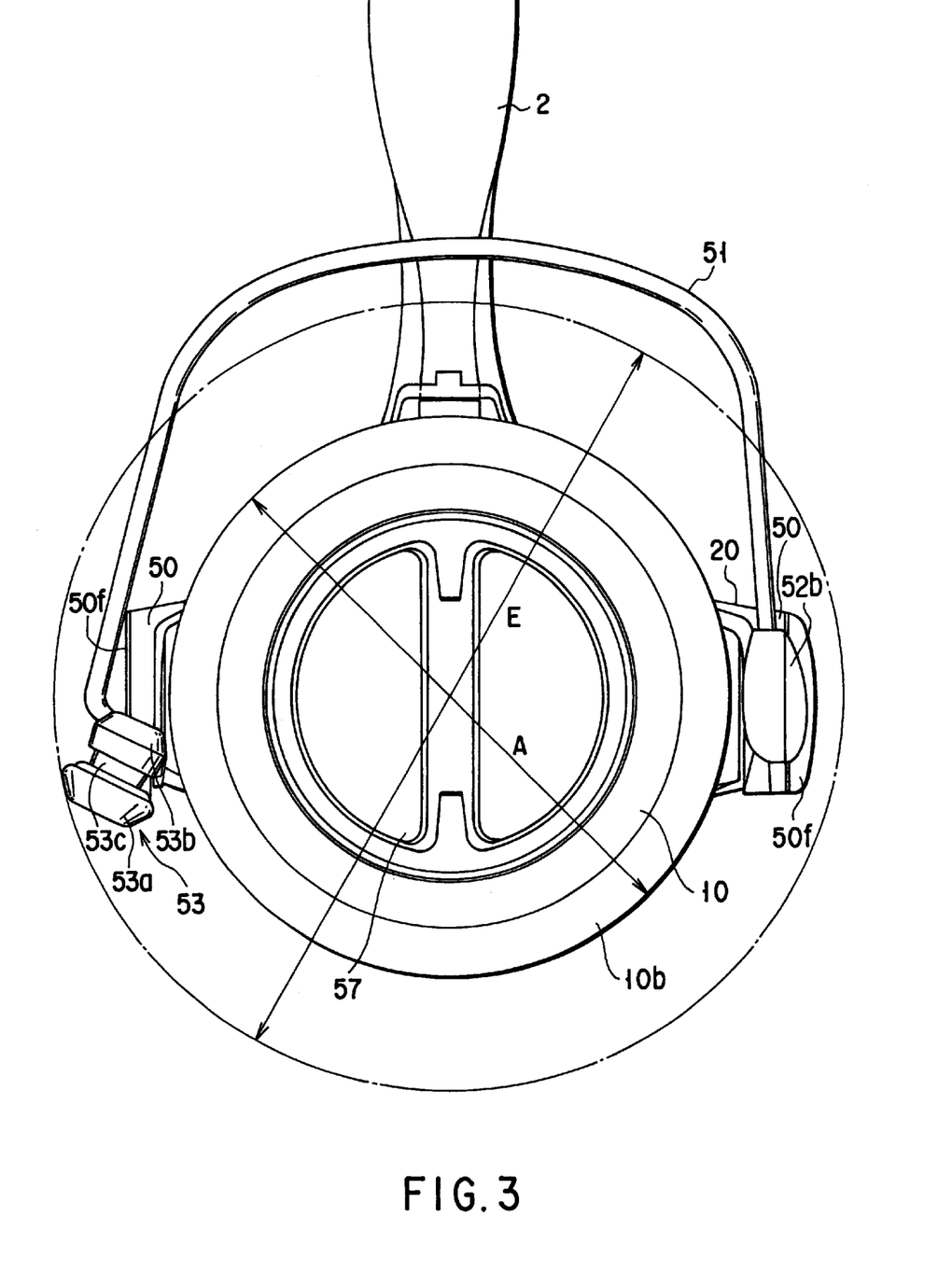
FIG. 3 is a front view of the spinning reel shown in FIG. 1.

An entire structure of a spinning reel will first be described with reference to FIGS. 1 to 3.

A reel body 1 of the spinning reel comprises a leg portion (rod attachment portion) 2 for attachment to a fishing rod, and a handle 3a supported at an end portion of a handle shaft 3 rotatably supported within the reel body 1. A drive gear 5 with inner teeth is attached to the handle shaft 3. The drive gear 5 is meshed with a toothed portion 7a of a rotor pinion 7 which has an inner cavity and extends in a direction perpendicular to the handle shaft 3.

A spool shaft 11 extending in a direction perpendicular to the handle shaft 3 and having a spool 10 at its distal end portion is supported axially movably in the cavity of the pinion 7. The pinion 7 is engaged with an oscillating mechanism for axially moving the spool shaft. The oscillating mechanism includes a worm shaft 12 extending in parallel to the spool shaft and an engaging portion 15 engaged with a helical groove 12a cut in an outer peripheral surface of the worm shaft 12 and screwed to a proximal end portion of the spool shaft 11. A gear 16 meshed with the pinion 7 is attached to an end portion of the worm shaft 12. If the worm shaft 12 is rotated by means of the pinion 7 and gear 16, the spool shaft 11 is moved back and forth by means of the engaging portion 15 guided along the groove 12a.

The pinion 7 extends toward the spool, and a rotor 20 is attached to a distal end portion of the pinion 7 by means of a nut 19. A front central portion of the reel body 1 projects toward the spool 10 as a projecting portion 1a, and this projecting portion 1a is disposed within a recess 20a in the rotor 20. The pinion 7, as shown in the figure, projects from the reel body 1 beyond the projecting portion 1a of the reel body. The pinion 7 is rotatably supported on the reel body by means of a front bearing 22 and a rear bearing 23 at a front side of the toothed portion 7a of pinion 7. The bearings 22 and 23 are disposed at a distal end portion and a proximal end portion of the projecting portion 1a of reel body 1, respectively. The rear bearing 23 is so constituted as not to project into the space within the reel body. The front bearing 22 supports a front end portion of the pinion 7 interposing an inner race of a one-way clutch, described below.

A one-way clutch 30 is disposed between the front bearing 22 and the rear bearing 23. This one-way clutch comprises an inner race 31 extending from a front end face of the rear bearing 23 along an inner peripheral surface of an inner ring portion of the front bearing 22, rotary members 32 disposed on the inner race, a holder 33 for holding the rotary members 32, and an outer race 34 engaged with the inside of the projecting portion 1a of reel body 1. The holder 33 is provided with a lever 37. The lever is rotated by the operation of an operating member 40 provided to project to the outside of the reel body 1 and holds the pinion 7 in a reverse rotation checking state/free rotation state.

A pair of support arms 50 are provided at a rear portion of the rotor 20. Support members 52a and 52b for supporting proximal end portions of a bail 51 are supported at distal end portions of the respective support arms 50 such that the support members 52a and 52b are rotatable between a line release position and a line winding position. One of the support members, 52a, is provided with a line guide 53 for guiding a line to be wound around the spool. The line guide 53 comprises an outside portion 53a formed integral with the support member 52a, a bail hold portion 53b for holding an end portion of the bail 51, and a line guide (line roller) 53c supported between the outside portion 53a and bail hold portion 53b. At the time of release of the line, if the support members 52a and 52b are turned and the bail 1 is raised, the line is disengaged from the line roller 53c. At the time of winding the line, if the support members 52a and 52b are turned down, the line is picked up by the bail 51 and guided to the line roller 53c.

The spool 10, as shown in the figure, comprises a winding body 10a on which the line is wound, a front flange portion 10b restricting a front side of the wound line, and a rear cylinder portion 10c restricting an end side of the wound line and covering the rotor 20. The spool 10 is attached to the spool shaft 11 by means of a drag knob 57.

Figure 4:
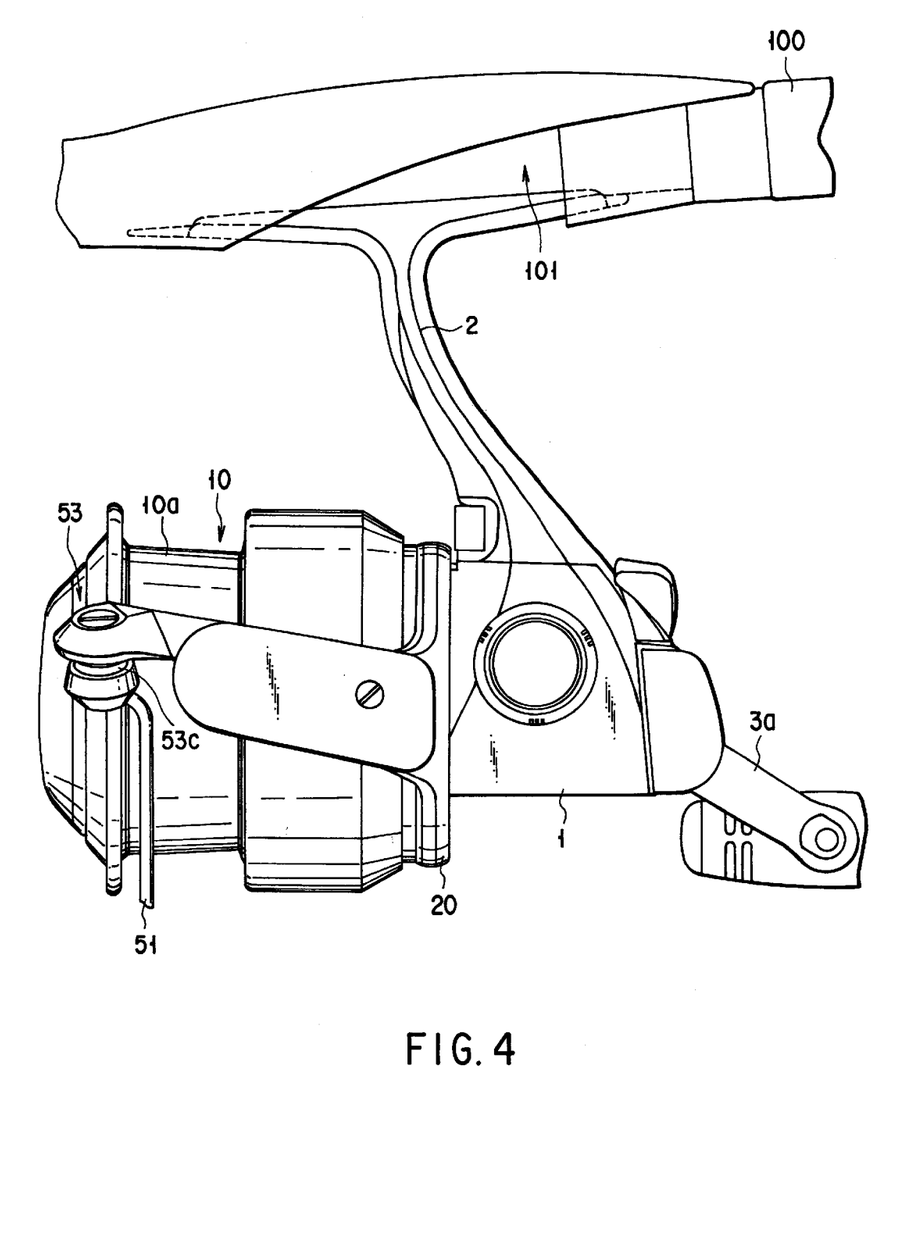
FIG. 4 shows a state in which the spinning reel shown in FIG. 1 is attached to a fishing rod.

The spinning reel having the above structure is attached to a reel seat 101 provided on a fishing rod 100, as shown in FIG. 4. If the handle 3a is actuated by a winding operation, the rotor 20 is rotated by means of the drive gear 5 and pinion 7, as shown in FIG. 2, and the spool 10 is moved back and forth by the pinion 7 and oscillating mechanism. Thus, the line is uniformly wound around the winding body 10a of spool 10 via the line guide 53c.

A description will now be given of specific forms of respective structural elements of the spinning reel with the above structure and the functional advantages of the spinning reel constituted with such forms.

The reel body 1 and spool 10 are constructed such that the ratio (A/L) of the diameter (A) of the front flange portion 10b of spool 10 to the axial length (L) of the reel body 1 between the rear end of the rotor and the rear end of the reel body is in the range of 115% to 200%. Thereby, the axial size of the reel body decreases, despite the size of the spool being increased, and the diameter of the spool 10 for winding the line, relative to the length of the reel body, increases. Accordingly, excellent line winding/releasing can be achieved. If the entirety of the reel is considered, the above ratio in size of the reel body 1 and spool 10 achieves a well-balanced relationship among the spool 10, rotor 20 and reel body 1. The spinning reel, which is easy to handle, small in size and efficient in line winding/releasing, can be obtained.

In the above structure, it is preferable that the pinion 7 be supported on the reel body 1 by means of a front bearing 22 and a rear bearing 23 at the front portion of the toothed portion 7a, as shown in the figure. Unlike the prior art the pinion 7 is not supported at both ends, but it is supported at the front portion of the toothed portion 7a. Thereby, a large internal space can be provided within the reel body 1. As a result, the worm shaft 12 of the oscillating mechanism can be efficiently housed, and the stroke of movement of the engaging portion 15 can be increased as long as possible with the minimum necessary space. Accordingly, the axial length (L) of the reel body 1 can be efficiently reduced and the above-mentioned ratio in dimension (A/L) can be easily achieved.

In addition to the above-described structure, it is preferable that the spool 10 be formed such that the ratio (A/B) of the diameter (A) of the front flange portion of the spool 10 to the diameter (B) of the rear cylinder portion 10c of spool 10 is in the range of 95% to 105%. Normally, the diameter of the rear cylinder portion of the spool increases as the diameter of the rotor increases. However, if the spool is formed such that the ratio (A/B) is in the range of 95% to 105% and the rotor 20 is formed so as to be housed within this spool, the increase in size of the rotor portion can be prevented and the diameter of the front flange portion 10b of spool 10 is increased. Thus, the line winding capacity can be increased. The ratio (A/B) is set at 105% or less because the ratio exceeding this value makes the diameter of the front flange portion 10b too large and this is undesirable in consideration of the line releasing properties.

As regards the above-described spool shape, it is desirable that the spool be formed such that the ratio (C/A) of the diameter (C) of the winding body 10a at an end of the winding body proximate the front flange portion 10b of spool 10 to the diameter (A) of the front flange portion of the spool is in the range of 70% to 90%. With the ratio of this range, the diameter of the winding body 10a increases and accordingly the diameter of the winding of line increases. Thus, curling of the wound line decreases and the line releasing properties are improved. It should be noted, however, that if the ratio (C/A) exceeds 90%, the amount of wound line undesirably decreases to a degree less than required.

Where the spool is formed as described above, it is desirable that the winding body 10a be so tapered as to a diameter decreasing from the front flange portion 10b toward the rear cylinder portion 10c. If the diameter of the winding body 10a is decreased toward the rear side, irregular release of line from the front flange portion due to collapsing of wound line can be prevented at the time of line release, and a trouble-free, smooth line releasing operation can be achieved.

In the above embodiment, it should suffice if the shapes, etc. of the reel body and spool of the spinning reel are set within the above-specified ranges. Various modifications may be made with respect to the other structural elements.

By constructing the spinning reel as described above, the size of the entire body is reduced and excellent line releasing/winding properties can be obtained while the reel has a well-balanced structure.

The paired support arms 50 revolve around the spool 10 as the rotor 20 rotates. In this case, the maximum diameter of rotation of the rotor 20 is determined by an end portion of the outer portion 53a supporting the line roller 53c. In FIG. 3, the locus of the rotor 20 with the maximum diameter of rotation, which is thus specified, is indicated by the rotor a dot-and-dash line, and the diameter is defined by E. Specifically, there is a tendency that as the diameter (E) increases, the size of the rotor increases and accordingly the size of the entire reel increases.

In the spinning reel shown in the figure, the rotor and spool are constructed such that the ratio (A/E) of the diameter (A) of the front flange portion 10b of the spool 10 to the maximum diameter (E) of rotation thus specified is in the range of 55% to 95%. With this relationship in dimension, the large-sized spool can be coupled to the rotor and reel body with good balance, while the increase in size of the entire reel body is prevented.

As has been described above, since the size of the spool is increased, excellent line release properties (smooth line release with less curling of line) can be obtained. In addition, with the compact body realized, the fingering operation of the line and of the rotation of the spool at the time of line release, etc. are facilitated. Therefore, a good line control is achieved. Furthermore, with the large-sized spool and compact body realized, the spinning reel with a large line winding capacity and a high line winding performance can be obtained.

The above ratio (A/E) is set at 55% to 95% because a ratio less than 55% will unnecessarily increase the size of the entire structure, like the conventional spinning reel and a ratio greater than 95% is undesirable from the standpoint of the line guide 53 and the strength of attachment of the support members 52a, 52b to the support arms 50.

Figure 5:
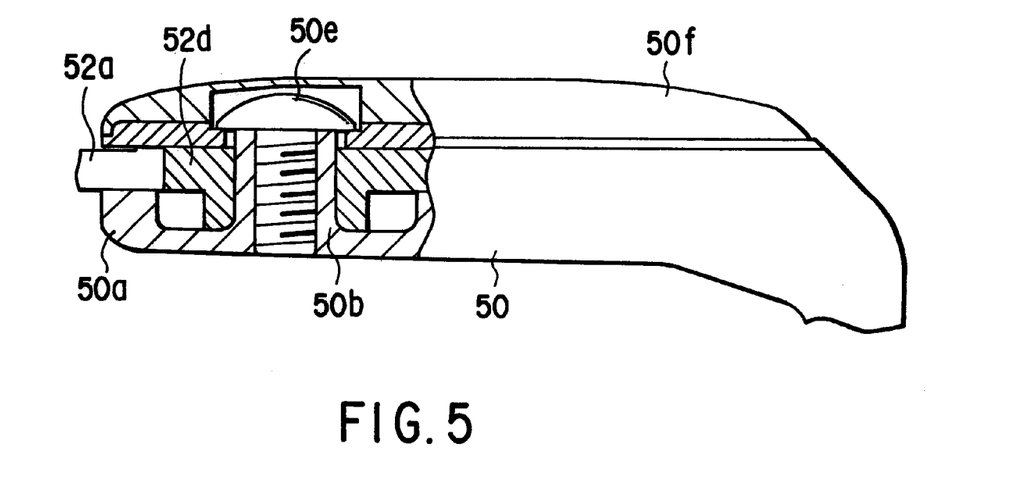
FIG. 5 is a cross-sectional view taken along line V—V in FIG. 1.
Figure 6:
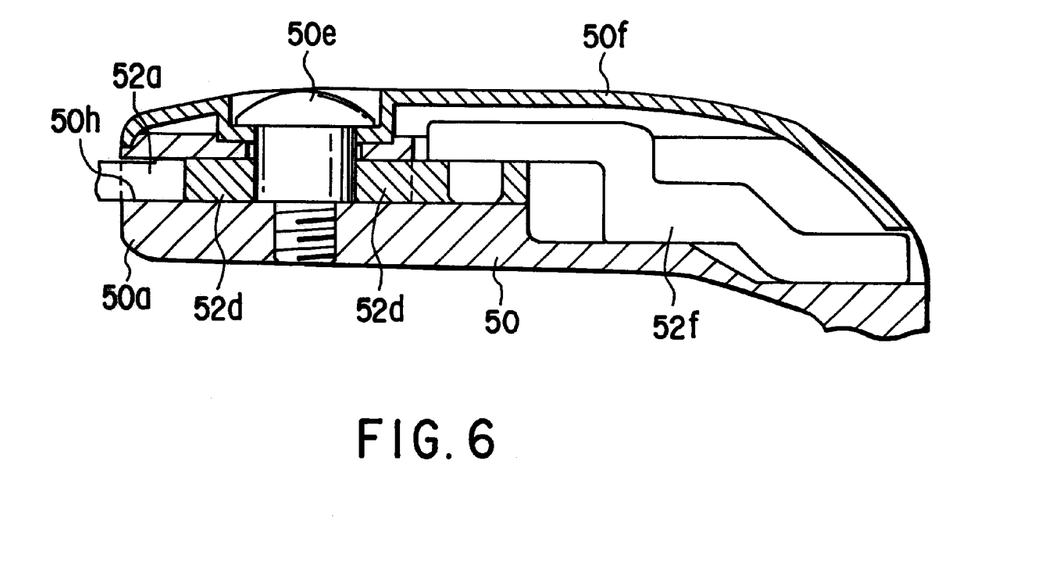
FIG. 6 shows a modification of the support structure shown in FIG. 5.

The above-mentioned ratio (A/E) is easily realized by constructing the support structure for supporting the support member 52a, 52b to the support arm 50, as shown in FIGS. 5 and 6. As will be described below in detail, the maximum diameter (E) of rotation decreases by reducing the thickness of the arm portions and thus the above-mentioned ratio (A/E) can be easily set in the range of 55% to 95%.

FIG. 5 shows a preferable example of the support structure for supporting each support member 52a, 52b to the support arm 50. FIG. 6 shows a modification of the support structure. Since the support members 52a and 52b have the same structure, the support member 52a alone is shown in these figures.

A rotational hold portion 50b is formed in a projecting shape at a front portion 50a of the support arm 50. At this portion, a proximal end portion 52d of the support member 52a is rotatably supported. A reverse-rotation member 52f, as shown in the modification in FIG. 6, is engaged with the proximal end portion 52d. Thus, after the bail is raised at the time of line release, the bail is reversely rotated and returned automatically by the winding operation of the handle. The proximal end portion 52d of this rotatably supported support member 52a is covered with a cover 50f by means of a screw 50e driven in the rotational hold portion 50b. Specifically, the proximal end portion 52d of the support member 52a is supported at the front portion of the support arm 50 in the state in which it is rotatably clamped.

In the modification shown in FIG. 6, an expanding slot 50h is formed in the front portion 50a of support arm 50 in the right-and-left direction in the figure. The proximal end portion 52d of the support member 52a is disposed in the expanding slot, and the screw 50e is driven in the front portion 50a through a hole formed in advance in the proximal end portion. Like the above-described structure, the proximal end portion 52d of the support member 52a is covered by the cover 50f by means of the screw 50e and is supported at the front portion of the support arm 50 in the state in which it is rotatably clamped.

In the conventional support structure, the proximal end portion of the support member is placed on a surface portion of the support arm and it is rotatably supported by means of a screw, etc. It is thus not possible to sufficiently reduce the thickness of the support structure from the standpoint of strength. In this structure, however, the thickness can be reduced by clamping and supporting the proximal end portion at the front portion of the support arm. Since the proximal end portion 52d of support member 52a is covered by the cover 50f, the surface of the body is smoothed and twisting of line can effectively be prevented.

It is also preferably to set the dimensions of the structure of the spinning reel in consideration of the relationship with the fishing rod.

Figure 7:
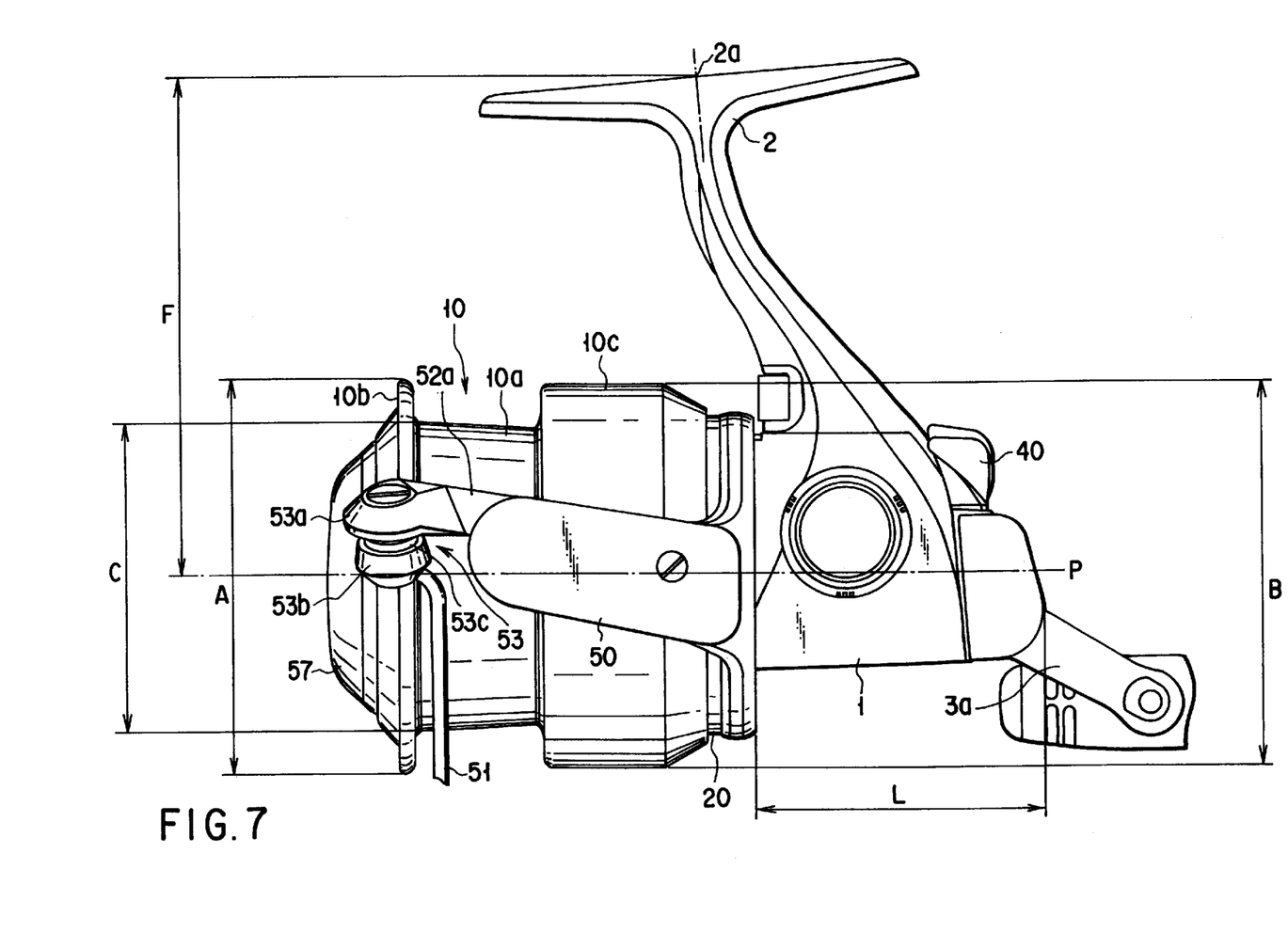
FIG. 7 is a side view for describing another embodiment of the spinning reel according to the invention.

In an embodiment shown in FIG. 7, the reel body 1 and spool 10 of the spinning reel are constructed such that the ratio (A/F) of the diameter (A) of the front flange portion 10b of spool 10 to the vertical distance (F) between a central portion 2a of the leg 2 of the reel body and the axis P of the spool is in the range of 60% to 150%. Thus, compared to the conventional spinning reel, the distance between the leg 2 and spool 10 is shorter and the diameter of the spool 10 is greater.

By forming the spool 10 and reel body 1 with the above ratio, the large-sized spool can be coupled to the reel body with excellent balance. Moreover, a good line winding/releasing performance can be maintained while an increase in size of the reel body is prevented. Since the distance between the spool 10 and the leg 2 of reel body 1 is short, the fingering operation on the line released helically from the spool 10 or on the spool is facilitated, and the fishing operability is enhanced.

The above ratio (A/F) is set at 60% to 150% because if the ratio is less 60%, the distance between the grasped fishing rod and the line wound around the spool increases and the operability of fingering, etc. deteriorates, and the size of the reel is unnecessarily increased. If the ratio is greater than 150%, the distance between the leg 2 and the spool becomes too short for the smooth operation.

In order to easily set the ratio (A/F), it is preferable to form the support structure for supporting the support member 52a, 52b on the support arm 50, as shown in FIG. 5 or 6. Specifically, by reducing the wall thickness of the support arm 50, the spool 10 and rotor 20 can be shifted as close as possible to the leg. Thus, the ratio (A/F) can easily be set in the range of 60% to 150%.

In the structure shown in FIG. 7, it is preferable to construct the reel body, spool and rotor so that the ratios (A/L), (A/B), (C/A) and (A/E) may be within the above-described numerical ranges.

The embodiments of the present invention have been described. In the present invention, it should suffice if the shapes, etc. of the reel body and spool of the spinning reel are determined according to the above-described ranges. With respect to the other structural features, the invention is not limited to the above embodiments and various modifications can be made.

What is claimed is:

1. A spinning reel comprising:
    a reel body including a leg for attachment to a fishing rod, and a rotatable handle attached to a handle shaft provided with a drive gear;
    a spool supported on the reel body, the spool including a front flange portion, a rear cylinder portion, and a winding body on which a line is wound;
    a rotor including a pair of support arms revolving around the spool;

a rotor pinion having a toothed portion for engagement with the drive gear, the rotor being fixed to a front end portion of the rotor pinion, and the rotor pinion rotating the rotor in accordance with rotation of the drive gear which is rotated by the handle; and an oscillating mechanism including a spool shaft attached to the spool, an engaging portion attached to the spool shaft, a worm shaft extending in parallel to the spool shaft and having a helical groove engaged with the engaging portion, and a gear attached to the worm shaft and engaged with the toothed portion, the oscillating mechanism reciprocally driving the spool in accordance with rotation of the drive gear which is rotated by the handle, wherein the rotor has a recess portion and the reel body has a projecting portion disposed within the recess portion, the rotor pinion is rotatably supported on the reel body at a front part by means of a front bearing and at a front part of the toothed portion by means of a rear bearing, the front bearing and the rear bearing provided respectively at a distal end portion and a proximal end portion of the projecting portion, and the winding body of the spool is tapered to have a diameter gradually decreasing from the front flange portion toward the rear cylinder portion.

2. A spinning reel comprising:

a reel body including a leg for attachment to a fishing rod, and a rotatable handle attached to a handle shaft provided with a drive gear;

a spool supported on the reel body, the spool including a front flange portion, a rear cylinder portion, and a winding body on which a line is wound;

a rotor including a pair of support arms revolving around the spool;

rotor pinion having a toothed portion for engagement with the drive gear, the rotor being fixed to a front end portion of the rotor pinion, and the rotor pinion rotating the rotor in accordance with rotation of the drive gear which is rotated by the handle; and an oscillating mechanism including a spool shaft attached to the spool, an engaging portion attached to the spool shaft, a worm shaft extending in parallel to the spool shaft and having a helical groove engaged with the engaging portion, and a gear attached to the worm shaft and engaged with the toothed portion, the oscillating mechanism reciprocally driving the spool in accordance with rotation of the drive gear which is rotated by the handle; and a rotatable support member, provided at a distal end portion of each of the support arms, for holding end portions of a bail, wherein said support arms are covered with a cover, and proximal end portions of the support members are rotatably supported on the support arms in such a state that the proximal end portions of the support members are clamped between the cover and the support arms.

3. A spinning reel according to claim 2, wherein the winding body of the spool is tapered to have a diameter gradually decreasing from the front flange portion toward the rear cylinder portion.

4. A spinning reel comprising:

a reel body including a leg for attachment to a fishing rod, and a rotatable handle attached to a handle shaft provided with a drive gear;

a spool supported on the reel body, the spool including a front flange portion, a rear cylinder portion, and a winding body on which a line is wound;

a rotor including a pair of support arms revolving around the spool;

a rotor pinion having a toothed portion for engagement with the drive gear, the rotor being fixed to a front end portion of the rotor pinion, and the rotor pinion rotating the rotor in accordance with rotation of the drive gear which is rotated by the handle; and an oscillating mechanism including a spool shaft attached to the spool, an engaging portion attached to the spool shaft, a worm shaft extending in parallel to the spool shaft and having a helical groove engaged with the engaging portion, and a gear attached to the worm shaft and engaged with the toothed portion, the oscillating mechanism reciprocally driving the spool in accordance with rotation of the drive gear which is rotated by the handle; and a support member, provided rotatably at a distal end portion of each of the support arms, for holding end portions of a bail, wherein the rotor has a recess portion and the reel body has a projecting portion disposed within the recess portion, the rotor pinion is rotatably supported on the reel body at a front part by means of a front bearing and at a front part of the toothed portion by means of a rear bearing, the front bearing and the rear bearing provided respectively at a distal end portion and a proximal end portion of the projecting portion, and said support arms are covered with a cover, and proximal end portions of the support members are rotatably supported on the support arms in such a state that the proximal end portions of the support members are clamped between the cover and the support arms.

* * * * *